United States Patent Office 2,828,343
Patented Mar. 25, 1958

2,828,343

PROCESS FOR THE PRODUCTION OF SECONDARY AMINES

John B. Tindall, Terre Haute, Ind., assignor to Commercial Solvents Corporation, Terre Haute, Ind., a corporation of Maryland No Drawing. Original application October 18, 1952, Serial No. 315,581. Divided and this application February 10, 1956, Serial No. 564,642

7 Claims. (Cl. 260—570.8)

My invention relates to a process for preparing a secondary amine by reacting ammonia or an alkylamine with a ketone and hydrogen in the presence of a catalyst, and to a new catalyst useful for carrying out such a process. More particularly, my invention relates to a process for preparing a dialkylamine by reacting ammonia or an alkylamine with a ketone and hydrogen in the presence of a catalyst consisting of an intimate mixture of cupric oxide and the sulfate of calcium or barium which catalyst is produced by reacting an aqueous solution of cupric sulfate with an aqueous solution or suspension of the hydroxide of calcium or barium and recovering the co-precipitated products. This application is a division of my copending application, Serial No. 315,581, filed October 18, 1952, and now abandoned.

The formation of secondary amines from alkylamines, ketones, and hydrogen is generally believed to take place in three steps: (1) condensation of the ketone with the amine to form an unstable intermediate hydroxy compound, (2) dehydration of the intermediate to form a Schiff base, and (3) hydrogenation of the Schiff base to the desired amine. In carrying out this series of reactions, however, one or more competing reactions are commonly encountered. Certain catalysts such as Raney nickel, for example, tend to favor the direct hydrogenation of the ketone to the corresponding alcohol, and thus to give low yields, based on the ketone. Certain other catalysts, such as palladium, tend to favor another reaction, in which the ketone condenses with itself to form a keto alcohol, which dehydrates to an unsaturated ketone, which in turn is partially hydrogenated to a saturated ketone having twice as many carbon atoms as the original ketone.

My invention is characterized by the discovery of novel catalysts that selectively catalyze the reaction between a ketone, hydrogen, and either ammonia or an alkylamine so as to favor the formation of a dialkylamine.

For use in my process I have found that ammonia, alkyl amines, and (arylalkyl)amines are operative, including those amines in which the alkyl group is of either straight chain or branched chain structure, such as methylamine, ethylamine, propylamine, iso-propylamine, butylamine, isobutylamine, octylamine, α-methylheptylamine, benzylamine, α-methylbenzylamine, phenethylamine, etc.

The ketones used in my process include alkyl or arylalkyl ketones such as: acetone, methyl ethyl ketone, ethyl isobutyl ketone, phenylacetone, benzyl ethyl ketone, etc.

The new catalysts for use in my process consist of an intimate, homogenous mixture of cupric oxide and the sulfate of calcium or barium. These catalyst components must be so finely divided and bound together that the smallest particle of one of my catalysts still retains both solid components within the single particle. Thus, during the time the hydrogenation reaction is proceeding, each solid component is in simultaneous contact with the other and with the same portion of the reaction mixture. Cupric oxide alone has been found to be a very poor catalyst for my process when not in intimate contact with the sulfate of either calcium or barium.

To achieve this necessary intimate, homogenous mixture I prepare my catalysts by reacting an aqueous solution of cupric sulfate with an aqueous solution or suspension of the hydroxide of calcium or barium, thus co-precipitating cupric hydroxide and the sulfate of calcium or barium. An aqueous solution or slurry of the desired hydroxide is prepared, and while agitating the solution or slurry a solution of cupric sulfate is slowly added. Or, if preferred the solution or slurry of the hydroxide of calcium or barium may be added to the solution of cupric sulfate. This co-precipitation of the two insoluble components of my catalysts in the same solution results in the formation of a homogenous, finely-divided, mixture.

The solid co-precipitate is heated to convert the cupric hydroxide present substantially to cupric oxide, which is indicated by a change of color of the precipitate from blue or gray to deep brown. A convenient method for carrying out this conversion consists of heating the entire reaction mixture, including the solid coprecipitate, in the reaction vessel. A period of 3 hours at from 80° to 100° C. is usually sufficient for substantial conversion when done in this manner. Thereafter, the co-precipitated catalysts is filtered from the reaction mixture, dried, and ground to the desired catalyst size.

The catalyst may be employed without previously heating to convert the cupric hydroxide present substantially to cupric oxide, for under my reaction conditions such conversion will take place during the first few minutes at the reaction temperature. However, I have found that my catalysts are much less active and lower yields of dialkylamines are obtained if the cupric hydroxide content is not converted to cupric oxide before use.

For use in a rocking bomb my catalysts are preferably ground to a size of approximately 120 mesh. If, however, they are to be used in a fixed-bed reactor it is preferred that the catalysts be in the form of larger granules or pellets.

The ratio of cupric sulfate to calcium hydroxide or barium hydroxide in the mixture from which my catalysts are co-precipitated may be varied as desired. I have found, however, that the resulting catalysts possess the greatest activity if the hydroxide is present in the mixture in molar excess of the cupric sulfate. Accordingly, I prefer to use a 5 to 15 percent molar excess of the hydroxide of calcium or barium. The use of ratios within these limits has been found to give the most active catalysts.

The relative quantities of reactants which can be used in my process vary over a wide range with either the alkylamine, including ammonia, or the ketone in excess. However, to minimize the loss of ketone by hydrogenation to the corresponding alcohol I prefer to use a 10 to 40 percent molar excess of ammonia or alkylamine.

The temperatures at which my process may be carried out vary from about 130° C. to about 225° C., but preferably range from about 150° to about 200° C. Pressures are limited by the necessity of maintaining a sufficient partial pressure of hydrogen and by the character of the equipment used. Pressures up to 5000 p. s. i. and above may be employed but the preferred range is from about 150 to 3000 p. s. i. For any particular alkylamine and ketone combination a set of conditions which will give the highest yield of the desired secondary amine can be determined by brief experimentation. Good yields are obtained throughout the ranges set forth.

In carrying out my process a mixture of the reactants and catalyst is introduced into a pressure vessel equipped with a suitable stirrer and a jacket or a coil for maintaining the charge at the desired reaction temperature.

Hydrogen is then injected at the desired pressure. During the reaction, hydrogen may be added as required to maintain the pressure at the desired level. When hydrogenation has been completed, as evidenced by the cessation of hydrogen absorption, the reaction mixture is cooled, the vessel vented, the contents thereof discharged, and the product isolated in a known manner.

Alternatively, I may carry out my process by passing the reaction mixture and hydrogen through a stationary bed of granulated catalyst enclosed in a reaction vessel of suitable design maintained at the desired reaction temperature and pressure. Thus my process is operable in either batch or continuous operation.

The following examples are given to illustrate my invention, and are not to be construed as limiting it to the exact reactions or conditions described.

Example I

To a suspension of 80 gm. of lime, technical, in 500 ml. of water was added with agitation during a period of 50 minutes at room temperature one liter of a solution containing 250 gm. of technical hydrated cupric sulfate in water. The mixture was then held at 90° C. for 3 hours and continuously agitated. The precipitate which formed was then recovered by filtration, dried at 70° C., and ground to pass a 120 mesh screen. The yield of catalyst was 225 gm.

Forty grams of the catalyst prepared above were added to a mixture of 200 gm. of phenylacetone and 500 ml. of methanol, and the mixture placed in a rocking bomb of 1840 ml. capacity. After cooling the bomb with solid carbon dioxide to avoid loss of methylamine 85 ml. of anhydrous methylamine was added and the resulting mixture subjected to hydrogenation for a period of 5 hours at a pressure ranging from 1000 to 1500 p. s. i. and a temperature of 160° C.

The contents of the bomb were then filtered to remove the catalyst, and treated with a solution of 130 ml. of 12 N hydrochloric acid in 500 ml. of water. The filtered mixture was subjected to distillation to remove methanol and non-basic products. The distillation residue was next diluted with 250 ml. of water and extracted once with 100 ml. and three times with 50 ml. portions of benzene. This benzene containing any remaining non-basic products was discarded. The extracted residue was then treated with 70 gm. of sodium hydroxide in 200 ml. of water and the resulting oily layer separated. The lower or aqueous layer was next extracted twice with 100 ml. and twice with 50 ml. portions of benzene. Finally, the separated oil layer and the benzene extract from the water layer were mixed and subjected to distillation through a packed column at atmospheric pressure until the oil was free of water and benzene, and then distillation continued at 10 mm. pressure until the vapor temperature reached 88° C. Two fractions of distilled oily product resulted: an 8.4 gm. fraction boiling from 72° to 82° C., and an 180 gm. fraction boiling from 82° to 88° C. The latter fraction contained upon analysis 99.38% desoxyephedrine and corresponded to a yield of 82% based on the phenylacetone used.

Example II

The catalyst was prepared by the same procedure as outlined in Example I above, except that the hydrated cupric sulfate used was reagent grade $CuSO_4 \cdot 5H_2O$. As in Example I a mixture of 85 ml. of anhydrous methylamine, 500 ml. of methanol, 200 gm. of refractionated phenylacetone and 40 gm. of the catalyst, prepared as described above, was subjected to hydrogenation at a pressure ranging from 1000 to 1500 p. s. i. and at a temperature of 160° C. After subjecting the reaction product to the same recovery operations described in Example I 195.4 gm. of a product containing 99.7% desoxyephedrine boiling from 84° to 89° C. was obtained. This amounted to a yield of 88.5% based on the phenylacetone used.

Example III

A solution of 29.8 pounds of technical hydrated cupric sulfate in 119 pounds of water was added in a steady stream over a period of 25 minutes to 9.6 pounds of calcium hydroxide in 60 pounds of water. The resulting mixture was then heated in a water bath to 90° C. and agitated at this temperature for 3 hours. The mixture was next cooled, filtered, and the precipitate dried by heating with hot air for 19 hours at 70° C. The dried precipitate was ground and screened, yielding 30.1 pounds of finished catalyst.

A mixture of 85 ml. of anhydrous methylamine, 500 ml. of methanol, 200 gm. of refractionated phenylacetone and 30 gm. of the catalyst prepared as described above was subjected to hydrogenation at a temperature of 160° C. and a pressure ranging from 1000 to 1500 p. s. i. in the same type reaction vessel described in Example I. The same recovery procedure described in Example I was employed. A yield of 203 gm. of product was obtained containing 99.6% desoxyephedrine boiling within the range of 84°–90° C. at 10 mm. pressure. This represented a yield of 92% based on the phenylacetone used.

Example IV

A solution containing 30 gm. of reagent grade hydrated cupric sulfate in 150 ml. of water was heated to 90° C. by adding live steam; then 1170 ml. of 0.230 N barium hydroxide was added. The resulting mixture was next heated for 3 hours with sufficient steam to maintain the temperature at approximately 90° C. The precipitate was removed by filtration, washed with water, air dried and ground. The weight of the dry catalyst recovered was 54 gm.

The catalyst prepared as above described was added to 300 gm. of methyl isobutyl ketone, 260 ml. of 70% aqueous ethylamine, and 200 ml. of methanol in a stainless steel rocking bomb and the mixture subjected to hydrogenation at 1400 to 1500 p. s. i. pressure and a temperature of 160° C. until hydrogen absorption stopped. N-ethyl-1,3-dimethylbutylamine was obtained in 86% yield based on the methyl isobutyl ketone used.

Example V

A mixture of 50 gm. of the catalyst prepared as described in Example I above, 580 gm. (10 mols) of acetone and 85 gm. (5 mols) of anhydrous ammonia was subjected to hydrogenation for 12 hours in the same type bomb as described in Example I at from 1000 to 1500 p. s. i. pressure and a temperature of 160° C. until hydrogen absorption stopped. Diisopropylamine was obtained in 73% yield based on the acetone used. The yield of isopropylamine amounted to 5% on the same basis.

Example VI

The catalyst was prepared in the following manner. A solution of 30 gm. of reagent grade hydrated cupric sulfate in 150 ml. of water was heated to 90° C. by adding live steam, and then 1176 ml. of 0.228 N barium hydroxide added. The resulting mixture was heated to slightly above 90° C. by live steam and held at that temperature for three hours. The precipitate was then filtered, dried, and ground, yielding 41 gm. of finished catalyst. Forty grams of catalyst prepared in this manner was placed in the bomb along with 580 gm. (10 mols) of acetone and 85 gm. (5 mols) of anhydrous ammonia added after cooling the bomb. The mixture was subjected to hydrogenation for 18 hours at a temperature of 160° C. and 1300 to 1500 p. s. i. pressure until hydrogen absorption stopped. The reaction yielded diisopropylamine in a 66% yield.

Now having described my invention, what I claim is:
1. A process for the production of secondary amines which comprises hydrogenating the reaction product of a ketone selected from the group consisting of alkyl ketones and arylalkyl ketones and a nitrogen-containing compound selected from the group consisting of ammonia, alkyl amines, and (arylalkyl)amines at a temperature of from 130° to 225° C. and under a pressure in excess of 10 atmospheres in the presence of an intimate mixture of cupric oxide and a compound selected from the group consisting of calcium sulfate and barium sulfate.

2. A process for the production of secondary amines which comprises hydrogenating the reaction product of a ketone selected from the group consisting of alkyl ketones and arylalkyl ketones and a nitrogen-containing compound selected from the group consisting of ammonia, alkyl amines, and (arylalkyl)amines at a temperature of from 130° to 225° C. and under a pressure in excess of 10 atmospheres in the presence of the co-precipitated products of the reaction of an aqueous solution of cupric sulfate with a hydroxide selected from the group consisting of calcium hydroxide and barium hydroxide in an aqueous medium.

3. The process as set out in claim 2 wherein the hydroxide is calcium hydroxide.

4. The process as set out in claim 2 wherein the hydroxide is barium hydroxide.

5. The process for the production of secondary amines which comprises hydrogenating the reaction product of a ketone selected from the group consisting of alkyl ketones and arylalkyl ketones and a nitrogen-containing compound selected from the group consisting of ammonia, alkyl amines, and (arylalkyl)amines at a temperature of from 130° to 225° C. and under a pressure in excess of 10 atmospheres in the presence of a catalyst comprising an intimate mixture of cupric oxide and a compound selected from the group consisting of calcium sulfate and barium sulfate, produced by heating to from 80° to 100° C. the mixture resulting from the reaction of an aqueous solution of cupric sulfate with from 5 to 15 percent molar excess of a compound selected from the group consisting of calcium hydroxide and barium hydroxide in an aqueous medium.

6. A process for the production of secondary amines which comprises hydrogenating the reaction product of a ketone selected from the group consisting of alkyl ketones and arylalkyl ketones and a nitrogen-containing compound selected from the group consisting of ammonia, alkyl amines, and (arylalkyl)amines at a temperature of from 130° to 225° C. and under a pressure in excess of 10 atmospheres in the presence of a catalyst comprising an intimate mixture of cupric oxide and calcium sulfate, produced by heating to from 80° to 100° C. the mixture resulting from the reaction of an aqueous solution of cupric sulfate with from 5 to 15 percent molar excess of calcium hydroxide in an aqueous medium.

7. A process for the production of secondary amines which comprises hydrogenating the reaction product of a ketone selected from the group consisting of alkyl ketones and arylalkyl ketones and a nitrogen-containing compound selected from the group consisting of ammonia, alkyl amines, and (arylalkyl)amines at a temperature of from 130° to 225° C. and under a pressure in excess of 10 atmospheres in the presence of a catalyst comprising an intimate mixture of cupric oxide and barium sulfate, produced by heating to from 80° to 100° C. the mixture resulting from the reaction of an aqueous solution of cupric sulfate with from 5 to 15 percent molar excess of barium hydroxide in an aqueous medium.

References Cited in the file of this patent

UNITED STATES PATENTS

| Number | Name | Date |
| --- | --- | --- |
| 2,045,574 | Adkins | June 30, 1936 |
| 2,146,475 | Hildebrandt | Feb. 7, 1939 |
| 2,270,215 | Fitch | Jan. 13, 1942 |
| 2,278,372 | Olin et al. | Mar. 31, 1942 |
| 2,381,015 | Von Bramer et al. | Aug. 7, 1945 |
| 2,533,723 | Dombrow | Dec. 12, 1950 |

FOREIGN PATENTS

| Number | Country | Date |
| --- | --- | --- |
| 844,228 | France | Apr. 17, 1939 |
| 117,706 | Australia | Nov. 2, 1943 |
| 892,289 | Germany | Oct. 31, 1951 |
| 159,077 | Australia | Mar. 13, 1952 |
| 902,853 | Germany | May 21, 1953 |